(12) United States Patent
Warner et al.

(10) Patent No.: US 12,311,273 B2
(45) Date of Patent: May 27, 2025

(54) INCIDENT RESPONSE SIMULATION AND LEARNING SYSTEM

(71) Applicant: PROCIRCULAR, INC., Coralville, IA (US)

(72) Inventors: Aaron Ray Warner, Coralville, IA (US); James Cameron Dayton, Scottsdale, AZ (US); Brandon B. Blankenship, Cedar Rapids, IA (US); Phillip James Holmer, Saint Paul, MN (US); Tyler Michael Olson, Minneapolis, MN (US)

(73) Assignee: CYBERCADE, INC., Coralville, IA (US)

( * ) Notice: Subject to any disclaimer, the term of this patent is extended or adjusted under 35 U.S.C. 154(b) by 84 days.

(21) Appl. No.: 17/832,356

(22) Filed: Jun. 3, 2022

(65) Prior Publication Data

US 2022/0387896 A1 Dec. 8, 2022

Related U.S. Application Data

(60) Provisional application No. 63/196,370, filed on Jun. 3, 2021.

(51) Int. Cl.
*A63F 13/80* (2014.01)
*A63F 13/335* (2014.01)
(Continued)

(52) U.S. Cl.
CPC ............ *A63F 13/80* (2014.09); *A63F 13/335* (2014.09); *A63F 13/44* (2014.09); *A63F 13/45* (2014.09); *H04L 63/1433* (2013.01)

(58) Field of Classification Search
CPC ........ A63F 13/335; A63F 13/44; A63F 13/45; A63F 13/50; A63F 13/52; A63F 13/57;
(Continued)

(56) References Cited

U.S. PATENT DOCUMENTS

| 2004/0166484 | A1* | 8/2004 | Budke | ............... | G09B 19/00 |
| | | | | | 434/433 |
| 2006/0031938 | A1* | 2/2006 | Choi | ............... | H04L 63/1441 |
| | | | | | 726/25 |

(Continued)

OTHER PUBLICATIONS

International Searching Authority, "Invitation to Pay Additional Fees and, Where Applicable, Protest Fee," issued in connection with PCT/US2022/032231, dated Aug. 3, 2022, 2 pages.

(Continued)

*Primary Examiner* — Omkar A Deodhar
(74) *Attorney, Agent, or Firm* — Nyemaster Goode P.C.

(57) ABSTRACT

A method of simulating an emergency response training scenario to users in different locations, including customizing a scenario, initiating a game state having a threat level (Continued)

and a time remaining, assigning a role to each of a plurality of users wherein each of the users uses a device, assigning digital assets within the scenario to each of the users, displaying an introduction sequence, initiating an incident and simultaneously notifying a first group of at least two users, logging and scoring a chosen response from the possible responses compared to a scoring system, updating the game state whereby the threat level is raised or lowered and the time remaining is increased or decreased, triggering another event to at least two of the plurality of users, and communicating a score calculated in the logging and scoring step to at least one user on one of the at least one client device.

20 Claims, 5 Drawing Sheets

(51) Int. Cl.
*A63F 13/44* (2014.01)
*A63F 13/45* (2014.01)
*H04L 9/40* (2022.01)

(58) Field of Classification Search
CPC ...... A63F 13/70; A63F 13/80; H04L 63/1433; G06Q 10/00; G09B 7/00; G06F 21/554
See application file for complete search history.

(56) References Cited

U.S. PATENT DOCUMENTS

| | | | |
|---|---|---|---|
| 2008/0020361 A1* | 1/2008 | Kron | G09B 23/28 434/262 |
| 2008/0221965 A1* | 9/2008 | Riddle | G06Q 10/06 705/7.19 |
| 2012/0258437 A1* | 10/2012 | Sadeh-Koniecpol | G06F 21/56 434/362 |
| 2014/0220515 A1* | 8/2014 | Waldron | A63F 13/35 434/107 |

OTHER PUBLICATIONS

International Searching Authority, "International Preliminary Report on Patentability," issued in connection with PCT/US2022/032231, dated Nov. 21, 2023, 10 pages.

International Searching Authority, "IInternational Search Report & Written Opinion," issued in connection with PCT/US2022/032231, dated Oct. 11, 2022, 10 pages.

Pucher et al., "Virtual-world hospital simulation for real-world disaster response, design and validation of a virtual reality simulator for mass casualty incident management." Journal of trauma and acute care surgery 77.2 (2014): 315-321, Aug. 2014 (Aug. 2014) Retrieved on Sep. 17, 2022 from <https://journals.lww.com/jtrauma/Abstract/2014/08000/Virtual_world_hospital_simulation_for_real_world.21.aspx>, 32 pages.

* cited by examiner

Roles and Responsibilities

| Role | Purpose | Possible Functions |
|---|---|---|
| Incident Communicator | Communicate Between the Response Team and the Rest of the Team. Receive Information from the Helpdesk | • External Communication<br>• Internal All-Company Communication<br>• Wordsmithing Support |
| CEO | Lead Business Response of the Incident | • Budget<br>• Strategic Direction<br>• Final Decision-Making Authority |
| CIO | Lead Technological Response of the Incident | • Technology Stack<br>• Security Stack<br>• Resource Management |
| HR | Lead the People Response of the Incident | • Hire / Fire Decision<br>• Onboard / Offboard<br>• Detect and Respond to Disgruntled Employees Who may be a Security Risk |
| Legal | Lead the Legal Response of the Incident | • Contract Reviews<br>• Contract Executions<br>• Clause Inclusions / Exclusions<br>• Serving Paperwork to Bad Actors'<br>• Adherence to Local and National Laws |

INCIDENT RESPONSE SIMULATION AND LEARNING SYSTEM

CROSS-REFERENCE TO RELATED APPLICATION

This application claims priority to and the benefit of U.S. Provisional Patent Application Ser. No. 63/196,370, filed Jun. 3, 2021, entitled "INCIDENT RESPONSE SIMULATION AND LEARNING SYSTEM", the disclosure of which is incorporated by reference in its entirety.

BACKGROUND

The area of incident response is a constantly changing and relatively unknown and untrained aspect of business. While discrete trainings help, these trainings are almost instantly out-of-date, may have poor attendance, and generally may not improve the response effectiveness of a response team of a given organization.

SUMMARY

One aspect of the present disclosure includes a method of automating an emergency response training scenario to users in different locations. The method includes customizing a scenario and initiating a game state on a host electronic device, automatically assigning a job to each of a plurality of actors, wherein each of the plurality of actors each has access to at least one client device connected to the host device, assigning digital assets within the scenario to each of a plurality of actors based on the job assigned to each of the plurality of actors, displaying an introduction sequence to the plurality of actors on the at least one client device, and initiating an incident. The method then includes simultaneously notifying a first group of at least two of the plurality of actors of the incident, logging a response to the incident from at least one of the plurality actors, updating the game state based on the incident and response from the at least one of the plurality of actors, and triggering an event that is simultaneously communicated to a second group of at least two of the plurality of actors, where the event comprises a severity level. The severity level of the event being triggered is based on a total severity level for the scenario. The severity of the scenario is increased by events and incorrect responses from the plurality of actors, and the severity of the scenario is decreased by correct responses from the plurality of actors.

Another aspect of the disclosure includes a method of simulating a realistic emergency incident for the purposes of training a plurality of users how to respond to the emergency incident, the method comprising the steps of preparing an emergency scenario having a game state, a time remaining, and a plurality of specific issues and a plurality of prepared responses to the plurality of specific issues wherein the plurality of prepared responses comprise reading threat intel, a decision button actuation, a single call, a multi-user call, and a super power use, displaying an introduction sequence to the plurality of users on a client device of each of the plurality of users, wherein the plurality of users are not co-located, defining a plurality of roles for the emergency scenario and assigning one of the plurality roles to each of the plurality of users, wherein a subset of the plurality of specific issues and a subset of the plurality of prepared responses are specific to each of the plurality of roles, assigning a subset of a plurality of assets to each of the plurality of users based on the assigned roles of each of the plurality of users, initiating an event of the emergency scenario, the event comprising at least one of the plurality of specific issues and at least one of the plurality of prepared responses, simultaneously notifying a first group of at least two of the plurality of users of the event, logging a response to the event from at least one of the plurality users of the first group, updating the game state by comparing the response to the event from at least one of the users to at least one of the predetermined responses, updating the threat level upwardly or downwardly, and adding or removing an amount of time to the time remaining, communicating the time remaining to each of the plurality of users, initiating a second event of the emergency scenario, the second event comprising at least one of the plurality of specific issues and at least one of the plurality of prepared responses, simultaneously notifying a second group of at least two of the plurality of users of the event, logging a response to the second event from at least one of the plurality users in the second group, updating the game state by comparing the response to the second event from at least one of the users to at least one of the predetermined responses, updating the threat level upwardly or downwardly, and adding or removing an amount of time to the time remaining, removing at least one of the subset of prepared responses when the threat level is updated above a predetermined threshold, and calculating a game score for each of the plurality of users by comparing the responses from each of the plurality of users to a predetermined table of possible responses to each event of the emergency scenario, and communicating the game score of each of the plurality of users to the respective one of each of the plurality of users.

Yet another aspect of the disclosure includes A method of training a plurality of users for a response to an emergency incident such as a data breach within a company, the method comprising the steps of preparing an emergency scenario having a game state, a time remaining, and a plurality of specific issues and a plurality of prepared responses to the plurality of specific issues, displaying an introduction sequence to the plurality of users on a client device of each of the plurality of users, wherein the plurality of users are not co-located, assigning one of a plurality of roles to each of the plurality of users, the plurality of roles comprising Chief Executive Officer (CEO), Chief Information Officer (CIO), Human Resources (HR), and Legal, wherein a subset of the plurality of specific issues and a subset of the plurality of prepared responses are specific to each of the plurality of roles, initiating an event of the emergency scenario, the event comprising at least one of the plurality of specific issues and at least one of the plurality of prepared responses, notifying a first group of at least two of the plurality of users of the event simultaneously, recording a response to the event from at least one of the plurality users of the first group in a database, updating the game state by comparing the response to the event from at least one of the users to at least one of the predetermined responses, updating the threat level upwardly or downwardly, and adding or removing an amount of time to the time remaining, communicating the time remaining to the plurality of users, repeating the initiating an event, notifying a first group, recording a response, updating the game state, and the communicating the time remaining steps until the time remaining reaches zero, calculating a game score for each of the plurality of users by comparing the responses from each of the plurality of users to a table of possible responses to each event of the emergency scenario and a corresponding score in each of a plurality of success factors, communicating the game score of each of the plurality of users to the respective one of each of the plurality of users, and creating a profile for each of the plurality of users wherein the game score is stored and compared to subsequent game scores for each of the users.

These and other aspects, objects, and features of the present disclosure will be understood and appreciated by those skilled in the art upon studying the following specification, claims, and appended drawings.

DETAILED DESCRIPTION

The disclosed incident response simulation or "game" system is an interactive dynamically driven simulation of hypothetical events during and following an emergency scenario such as a severe cyber security incident. The dynamic nature of the system may be based on prior real-world decisions and actions taken in connection with one or a plurality of non-hypothetical cybersecurity incidents so that the response of the hypothetical simulation more accurately mimics a non-hypothetical cybersecurity incident. The hypothetical events are typically based on historical events or one or more experts' experience during actual cybersecurity incidents. The incident response game should give participants a valid test of their incident response plans, while also providing the basis for conversation and improvement. While typical incident response training may force many aspects, digital incident response training can allow for greater amounts of immersion and choices, more in-depth scenarios, and generally more interesting outcomes.

One goal is to improve a client's ability to respond to a cybersecurity incident. Participants should be able to say things like "I feel like I know who to call (resources documented)," and "I feel like we're better prepared than we were" after experiencing the methods and systems. Participants also should be able to Identify gaps (monitoring, detection) and the communication schedule (when to call exec, legal, etc.).

Some of the additional goals are to meet compliance requirements, to be a fun and memorable experience, to encourage executive engagement, to identify how the participants would respond to a real event and learn from it, and to learn and understand the incident response (IR) steps and stepwise approach to the incident response.

The target audience for an incident response game is primarily companies and groups of interested individuals. As a multiplayer experience, group size should be flexible. Multiplayer for the "board game" version is generally local, however with the improvements disclosed in detail below the players no longer need to be local but can interact between one or more computer systems operable interconnected with one another via wired or wireless signals.

The content within the game should be approachable for people without a cybersecurity background. A large part of incident response lies in teamwork, and by allowing for communication in an interactive, adaptive, and dynamically driven 'drill' environment, more understanding and knowledge can be shared by all 'roles'.

Generally, the systems of the present disclosure provide a "game" or learning environment that is about responding to an emergency situation such as a cyber-crisis effectively. The system could conceivably be a sort of cooperative role-playing game that provides each person with a role to interact and affect the simulation. Typically, the systems of the present disclosure incorporate an artificial intelligence engine on a Cloud based Infrastructure as a Service (IaaS), which are typically hosted through Google Cloud Platform (GCP), Amazon Web Services (AWS), or Microsoft Azure. Similarly, the users ("players" or "Actors") of the systems of the present disclosure typically each interface with the system using a browser on any computing device (i.e. a Desktop, Laptop, Tablet, Mobile Device, Etc) that is available to them wherever they are. Virtual Reality (VR), Augmented Reality (AR), and released computing applications (personal computing or mobile (via the Apple App-Store and Google Play) may be incorporated into the system of the disclosure for a more personalized and "real" experience.

The systems of the present disclosure where users interact with the system via their computer systems are typically used for a variety of reasons. First, if all of the users are able to participate at the same time in a time-based system, the system can receive input from each user simultaneously or at different times as other users playing their roles making the simulation of the organization and all people, processes and technologies as realistic as possible while having each action or lack of action affecting the results of the system/gameplay. Second, such a configuration may be asynchronous allowing for multiple participants to use the system over a period of time in a more turn-based environment over the span of many hours, days or perhaps even weeks. This allows for the accommodation of the busy schedule of executives, information technology professionals and perhaps third parties within an organization while still allowing the learning opportunities to occur that result from the user of the systems of the present disclosure.

The systems of the present disclosure typically start the "game" with the onset of a cybersecurity incident. The incident may happen immediately after the users begin or a period of time after the "start" of the participation of the users. Prior to the user's participating in the "game", the users are divided into specific roles either by assignment by the host or by their choosing. Each role will have a different set of data available and presented to them and different responsibilities assigned to them throughout the incident scenario. The unique data available to a given user/role as well as the different responsibilities assigned to a given user/role may be communicated to the user via the user's computer system while using the computer system to participate in the interactive simulation of the present disclosure.

The incident scenario being played is bounded by objectives and lose conditions. During the game, players must execute their roles to avoid the specified lose conditions and to complete objectives. In addition, objectives and lose conditions may change throughout the game based on actions and/or events, so players must react accordingly based on their roles and the information and actions that are available to them.

A small but concrete example of game flow can be expressed through the eyes of the public relations (PR) role. At the start of an incident, the PR role is responsible for mitigating reputation damages. In an example scenario, a hacker may have shut down all authentication services for a payment service associated with the company or group. In this case, companies who use the service will be upset that they cannot sell their product. It is the role of the PR or human resources (HR) role to keep these companies happy and continue to brief relevant news agencies and other public-facing information sources of the situation.

The game typically ends when all objectives have been met or a single lose condition has been met. Objectives and lose conditions are known to all roles, so progress can be tracked on a primary screen that is available to everyone. The primary display typically provides uniform information about the simulation occurring to all users simultaneously. At the end of each Scenario each participant or actor has a chance to review the log or other recording of their personal interaction with the simulation and optionally how each other person was performing and what they were doing at the same time but in a different role. This provides a significant post event learning experience for personal one-on-one training with a trained expert in the field of the scenario such as a cyber security expert, a scenario facilitator, or other personnel, or individual review and reflection and/or analysis to learn from the experience.

The game may consist of a few different screens: examples may include a primary screen, an observer screen or screens, and a role screen or screens.

The primary game screen is responsible for dictating the most important information to players. Examples of information available to the players on this screen may include a news ticker (for important objectives/stock prices/media coverage), current events, a system overview, emails, system dashboards, and weekly status reports. Players will also have interaction locations for use with one or more players. Examples of these locations may include a conference room, an instant message, or a video call. Other screens and their availability to certain roles will be discussed within their specific contexts below.

All Actors will have the opportunity to take training during a given tabletop exercise. Training will consist of real-world Cyber Security principles. Users taking training will lower the threat and be receiving hints as to the right decisions to make. The training will have both text, video, and metagame options to engage with the user. Metagames may be, for example, testing on phishing emails or other infiltration techniques used by cyber criminals.

The systems of the present disclosure typically provide an interactive, dynamic learning experience "game" that is designed to not be competitive, instead it is a digital party-based role-playing game. The systems of the present disclosure are designed to provide simulated real-world experiences that reinforce and teach results of one or more specific scenarios instead of overall progress in a single "game". The scenario(s) should not be set up where participants are fighting the scenario (e.g. a scenario where the participants are saying or thinking "that couldn't happen"). The systems of the present disclosure should not provide an interactive experience where the user gets stuck on one particular issue. The systems of the present disclosure typically should focus more on incident response than Business Continuity Planning (BCP), i.e. no world ending scenarios right out of the gate, and the game should inform variables from risk assessment like patch maturity, etc. These variables may include Cyber Security Framework (CSF) or Center for Internet Security (CIS) scores which may be considered to change the game state and can be preset in scenario creation or change during gameplay.

Definitions

Scenario: The scenario or incident scenario is a definition of the story, settings of the organization, and structure of a game. Scenarios consist of multiple sections including organization configuration, scenario type (type of incident), preconfigured and custom events, and the settings of the Assets. Scenarios are highly customizable and allow users to create scenarios to fit their specific situation.

Asset: An object whose components are affected by events throughout the scenario. Each asset falls under 5 categories: Data, Application, Devices, Users, and Infrastructure. Each asset has an internal state defined by specific attributes.

Actor: An Actor is a defined slot played by a player or NPC. Each Actor carries out actions available according to its type and responds to events themed around its type. Each Actor has a Role/Job (CFO, CIO, Incident communicator, HRIT Director, etc.) and a Role (Incident response coordinator, incident communicator, etc.) The combination of Job and Role determines the combinations of available actions.

Events: Events are actions 'fired' or initiated/launched by the simulation or caused by an Actor which alter the state of game Assets. Events are generally assigned to phases and are designed to exist for a specific length of time. Events can also fire other events, causing event chains during the experience of the user.

Phases: Phases are the major chapters within the scenario corresponding to the SANS (SysAdmin, Audit, Network and Security) incident response steps. According to SANS, there are six steps involved in properly handling a computer incident: preparation, identification, containment, eradication, recovery, and lessons learned. Phases are used to determine the progress of the game, the type of events that can be fired by the simulation or Actors, as well as a guide to the order of operations that should be followed by the Actors.

Time: The primary score each Actor views to determine their current progress and currency thereof is a time based counter. Each decision they make costs time and it will deprecate their time. For instance, time moves differently in-game based on decisions and button presses by the Actors within the game. Button presses that affect time may include, from slowest to fastest, reading threat intel (near stopped), no buttons pressed, single call, multi-user call, super power (fastest). Time will be displayed in days, weeks, and months. This shows that a crisis doesn't get fixed in an hour, but in months.

Organization: Organization is the collection of Assets that make up the objects that can be affected by Events fired by either the Scenario or an Actor.

Log: The running list of object actions and events within the game. An example of a line item from a log is:
   9.12.2019.12:34:21 An Actor[IT Manager] fired Event [Remove Malware] on Asset[Computer(34)] in Phase [Eradication]

Game Process

Figure 1:
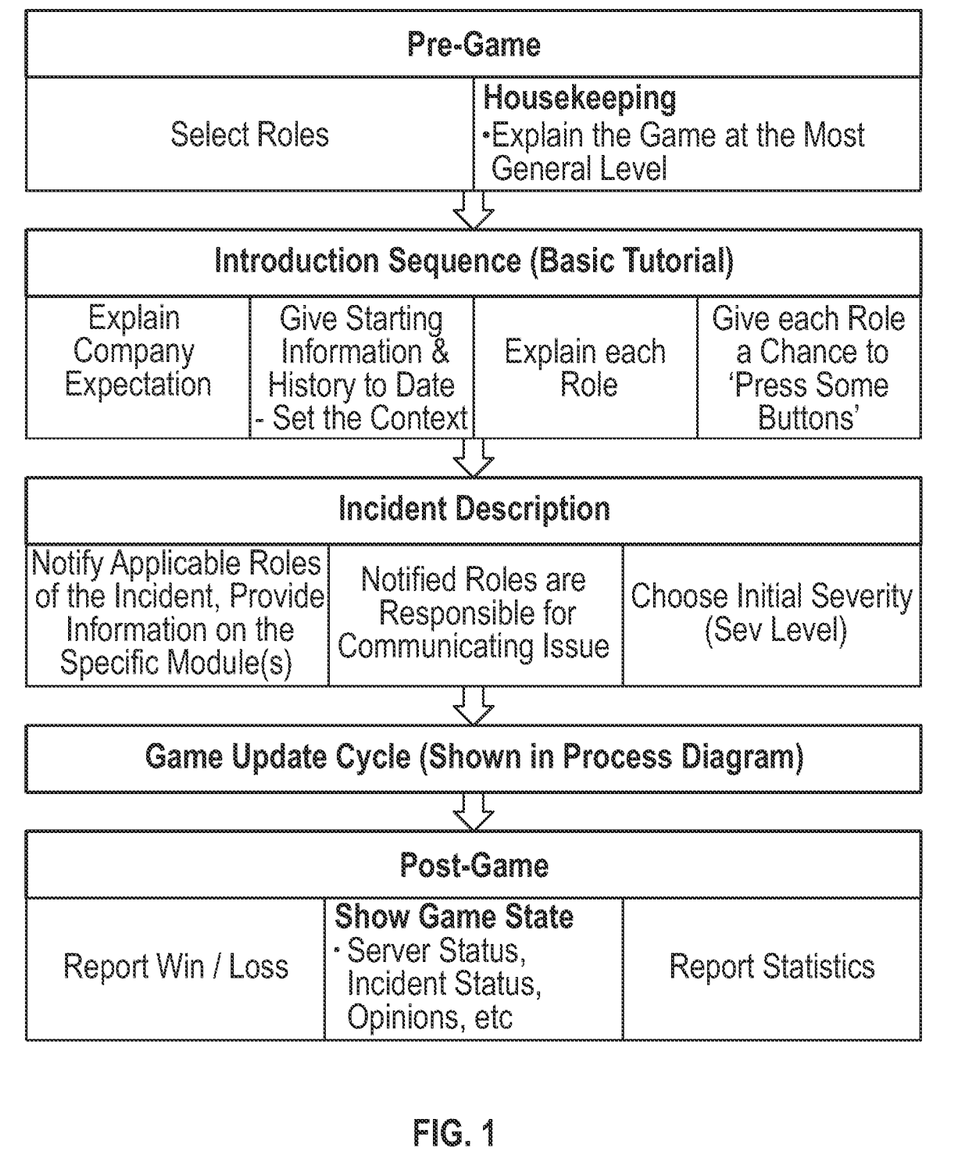
FIG. 1 is a sequential process diagram to show off the non-game loop portions of the game.

As shown generally in FIG. 1 and described below and in further detail, the game progresses in the following fashion, where (L) Indicates loop and (S) Indicates simultaneous action. The states are represented within FIG. 1 in a top to bottom order and follow the time progression of the game. Specifically, it shows the states before and after the main game loop.

Pre-Game

The pre-game phase is used to explain what players will be participating in, meaning an extremely general overview of what the game is and what its objectives are. In addition, roles are selected at this stage of the game. The Pre-Game phase may be used to introduce a tutorial whereby a user chooses a role, makes a simple decision, takes some in-game training, meets another user in a room, and/or uses a super power. A message at the end of the tutorial may appear that the tutorial was simply a penetration test, and the actual game has not begun. The pre-game phase may be done via the computer systems of the present disclosure interacting with one or more main computer server systems hosting the role-playing simulations of the present disclosure or could conceivably be given live by a person or live via videoconference presentation to each participant. Advantageously, as updates are made to the scenarios on the main computer system, they are also pushed out to the client devices in real-time, allowing the host of the scenarios to continuously improve or update the events, scoring, or other details of the scenarios with little or no effort on the part of the organization undergoing the training simulation.

Introduction Sequence

During the introduction sequence, players are told about their objectives for the upcoming scenario. The organization's expectations during the scenario for each participant are also typically defined at this stage in the process/method. Each role will receive a short written and/or audio-visual description about their purpose and what they are expected to do when reacting to an incident. Players are typically not co-located during the simulation and typically are using their own electronic device such as a personal computer or an internet-connected tablet. The simulation may be run on an installed app on the device, or via a web browser on the device. It should be known that any internet-connected device may be used such as a PLAYSTATION®, NINTENDO SWITCH®, or XBOX® console. The users are typically given a quick tutorial on how to use their device, and how the main screen works.

In the automated, interconnected computer system/version of the game the pre-game and introduction processes are combined into what is called the "lobby." The major benefit of the lobby system is that the players do not need to be co-located. At a time when it may be more difficult to get all the important players in the same room for several hours, an entire day, or even longer, this allows for a far more flexible scheduling time frame that is more realistic than a group being isolated for a time. The lobby system allows players or actors to join from wherever they are and have access to all the information that would be available to them had they been co-located for a time. The introduction may include a log-in screen where the user enters requested details, or the login screen may be a stand-alone process.

Role Selection

Each user selects one of a variety of personas, each detailed below. These may be based on their real-life role within the organization, may be random in order to allow users to experience and learn other roles, or may be selected based on a training goal set for each user. The roles include Chief Executive Officer (CEO), Chief Information Officer (CIO), Legal, and Human Resources (HR). Optionally, a communication officer may also be selected. While these roles are specific to the exemplar scenario, other roles may be added, some roles may be removed, some roles may have different names, or roles changed altogether for other scenarios for training in unrelated fields. Significantly, the naming of the roles may be changed to precisely match the names of the roles within a particular organization so as to better educate the participants in the scenarios about their particular role or roles.

Incident Description

This phase represents the initial signs/opening moves of an incident. In a more discrete incident, some roles may not be notified by the game of an incident occurring. However, the roles who DO receive the information on an incident are responsible for notifying the correct roles of the incident, establishing an initial level of severity, and providing each actor with their time using one or more of the communication tools at their disposal. Some of the information disseminated to the Actors is general in nature and sent to everybody, and some is specific to the Actor's role and is sent specifically to that Actor in that role.

(L)Update Game State

Figure 2:
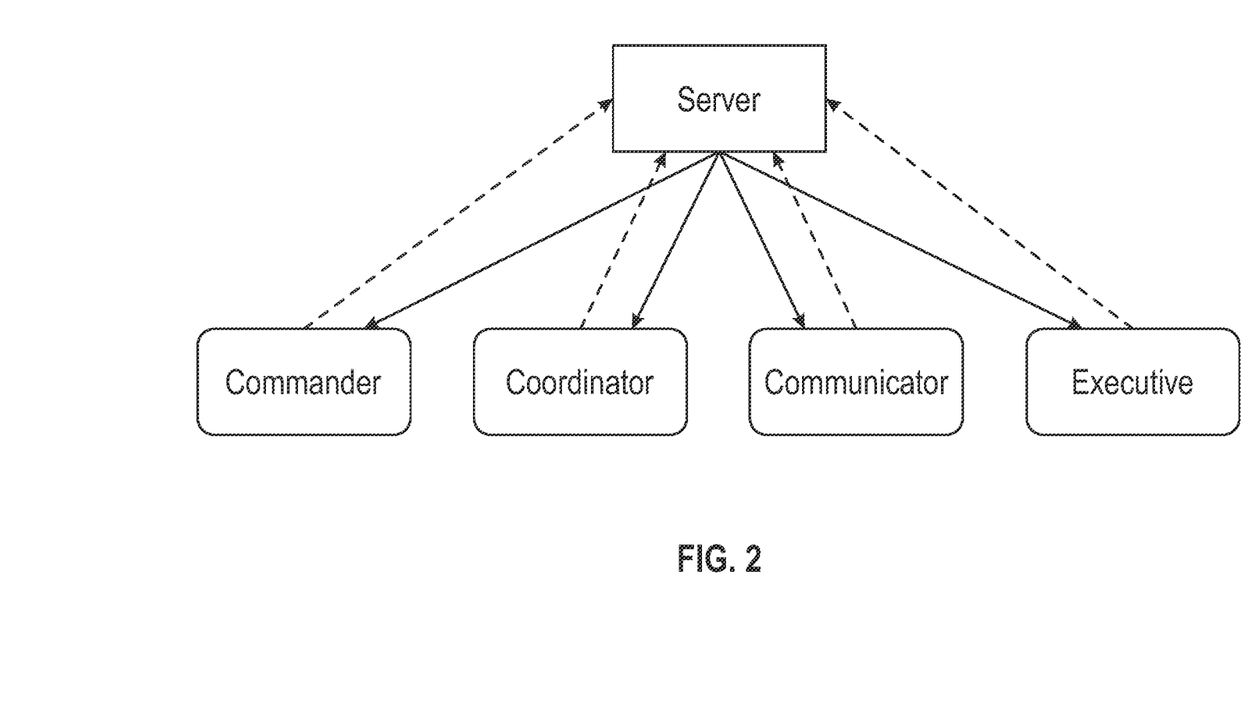
FIG. 2 is an overview of the server-client communication scheme used in the wargames project.

This is the initial part of the main game loop. This 'turn' is used to apply updates to the entire game. During this phase, the main screen is updated, events are dispatched to appropriate roles, and the incident in question can escalate (based on events). This update cycle is detailed in FIG. 2, which shows and describes the communication links between the players and the server. As shown in FIG. 2, the server has one entry point where it is routed to the correct endpoint based on the needs of the client at that moment. Multiple clients are represented on the right-hand side of the diagram, each client residing inside of a specific session, used to identify the client's game on the server side.

The Actors may use the clients in order to communicate with one another. They may communicate weekly status reports and emails, review strategy, and discuss possible solutions to the specific issues and tasks before them. The communication tools at the Actor's disposal may include video calling such as built-in video-conferencing systems, Microsoft® Teams, WEBEX®, or Zoom™ calls. These video calls may include the ability to see and share data with one another, but does not allow the Actor to complete certain tasks such as responding to emails or the like. Another communication tool may include a quick message platform whereby an Actor may interact with a single other Actor. An in-person conference room may be set up whereby all Actors may interact with one another but certain tasks may not be completed.

An important distinction is between a client and session. The client is the individual machine (a single instance of the game), while a session is a "grouping" of clients all playing in the same game (one team). Sessions do not receive any messages; they are there as an organizational tool. The communication API used in this figure is discussed in detail below.

Immediately following the game state changes, players are asked to act. The following two phases are simultaneous and rely completely on player actions.

(L)(S) Player Discussion

One of the most significant learning components of the systems of the present disclosure is the communication phase of the simulations. During this phase, players are forced to look at the changes to the status of the incident, clarify what is happening with each other, and discuss the actions they would like to take. The user must decide what information to share, information that may be uniquely available to them in the simulation but may not be as well. This discussion happens simultaneously with taking actions. The communication phases provide for practice and learning of effective communication skills in a crisis while also teaching what information each role has available to it and that it should or should not share with the other users.

(L)(S) Roles Take Action

The time when each user/"player" takes some action (or takes action by not taking any action) is typically the most impactful phase of the game, this phase pushes players to make decisions to try and remedy or stem the incident at hand. This phase is on a time limit and happens at the same time as group discussion. During this phase, any actions taken immediately update the game state, setting up the AI phases that follow. In addition, roles are distinct, and each role has specific actions which they take. The Actors have access to a desk whereby they have full access to make all decisions, use any special abilities they may have been granted, and read all information available to them in their role. While at their desk, however, Actors may not interact with other Actors. One of the communication tools listed above (Video calling, quick message platform, or in-person conference room) may be used to facilitate Actor to Actor communication.

At this point, if any special abilities have been made available to any or all of the Actors, they may be used. Some of these special abilities may include stop time (CEO), lower the threat level (CIO), win a lawsuit (Legal), make a unicorn hire (HR), spend a certain amount of time to make the right decision (All), and give time to another Actor or role (All).

Further, some actions that are available to a role in normal game play may not be available if a certain threat level is reached. For instance, if a decision is made that is predetermined to be not correct, the threat level may rise. Conversely, if a correct decision is made and the corresponding task is completed, the threat level may be reduced. As the threat level rises, certain options, decisions, and tasks to complete may be made unavailable that corresponds to the differing real-world ramifications of those decisions and tasks.

At certain points during the game, puzzles and other meta-games may be presented to the Actors that relate to their role within the team. As the scenario advances, the puzzles may get progressively harder, while incorporating elements from earlier puzzles or meta-games to give the player a sense of using learnings to their advantage.

At any point during the game, Actors may navigate to a related training module. This training module may provide hints to solve the puzzles and meta-games, which is a smaller "game" within the overall learning scenario "game" that is being presented. These smaller games provide an opportunity for additional, specific and focused learning during participation in the overall scenario. The smaller games may be, for example, a puzzle to identify a phishing electronic mail among several possible phishing electronic mail examples or password brute force testing regarding the strength of a password for possible use. These smaller games typically progressively get more difficult for the user (L) AI Takes Action After the players are given an opportunity to discuss their information available and take appropriate actions based on that information, the AI then takes certain actions and updates the availability and current conditions of the assets based on the actions that were taken by the players.

There are many types of AI activity within the game. For example, one AI response could be acting as a customer, who depending on site downtime, could drop their service. Another type of AI activity could be a spread of infiltration from system to system.

(S) Check Objectives

When this phase is reached, the predefined objectives for winning and losing are checked. When the scenario is created, certain conditions may be determined such that, if met, the simulation ends. If these conditions are met, the simulation will drop out of the loop into the post-game phase.

(L) Trigger Events

This phase is responsible for observing in-game state and triggering events accordingly. Some events are defined within the scenario and require specific triggers to occur. Other events are random and may be interjected into the game at random times. Once all criteria are met for an event, it is fired and dispatched to appropriate roles on the Game Update phase. The game update is communicated to all relevant actors simultaneously, regardless of whether the actors are co-located in the same room, in the same building, or in completely separate locations without access to a common screen.

Post-Game

Post-game is simply used to debrief the scenario to all players, report on progress and performance, as well as show any other useful information in review. The final scene, a short video, of the game is then typically displayed to the team. All of the Actors are brought together to review their decisions, scores, and the outcome of the game. A debrief may occur at this time, or be scheduled for the near future to review the details of their successes and failures. This debrief will showcase what the Actors did well and what the Actors could have done better.

Roles

Figure 3:
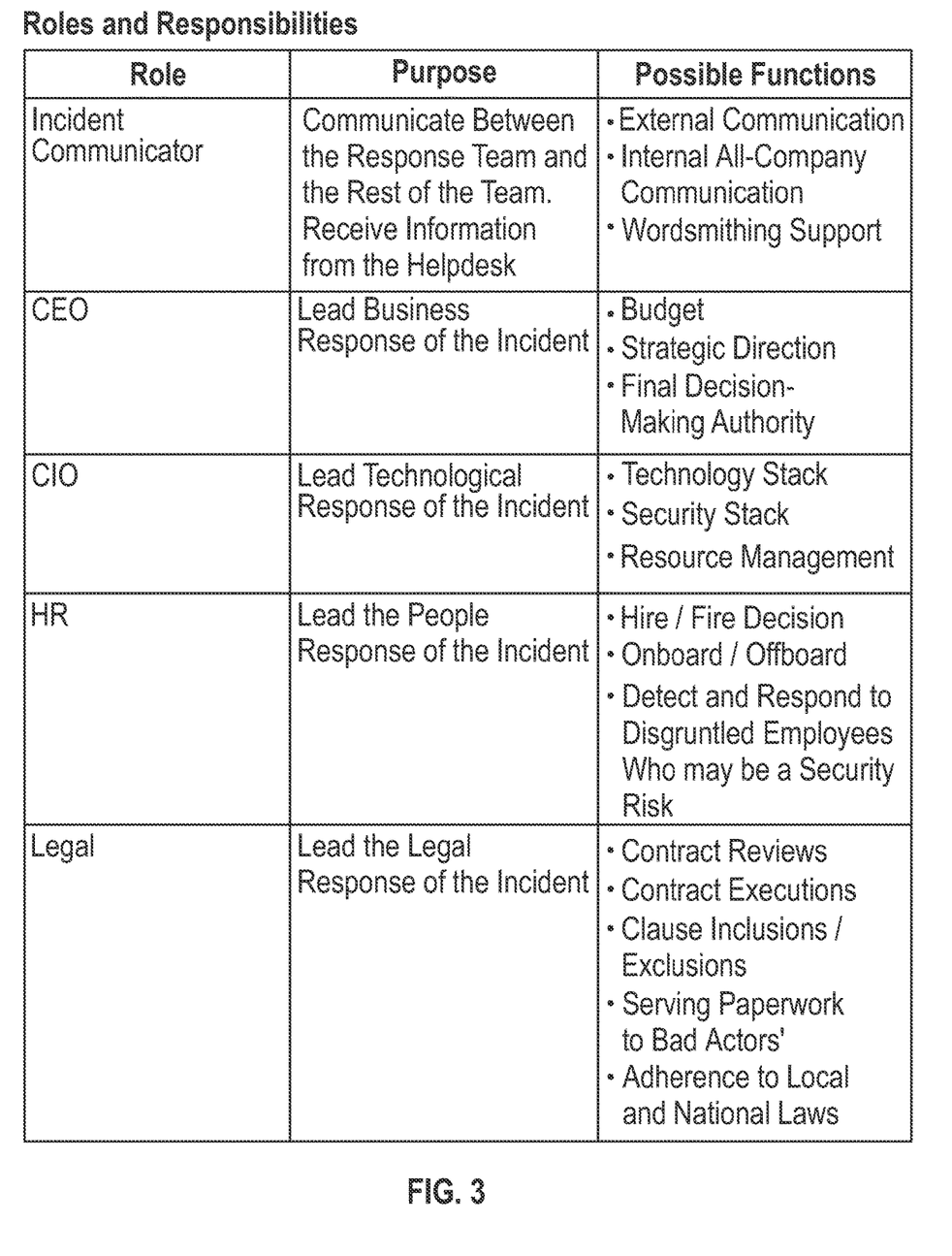
FIG. 3 is an overview of the roles of the game.

As shown in FIG. 3, roles correspond to the activities undertaken by Actors during an IR scenario. The following are the major incident response (IR) roles within the scenario. Each Role has a special ability unique to that Role. It should be known that the titles of each of the roles are not as important as the jobs and requirements of the roles. The titles could be changed to anything appropriate to the given scenario. Additionally, the roles available in any given scenario may be added to, removed, or tailored to fit the given scenario or type of training the organization desires.

Incident Commander; An incident commander—also known as an incident manager—is often a member of the IT (Information Technology) or DevOps (Development Operations) team who is responsible for managing the incident response. This non-playable character's (NPC) priority is to guide an incident to its resolution as quickly and completely as possible, while managing the resources, plan, and communication involved in that resolution. The incident commander is responsible for the implementation of the response directive(s) set by the incident commander, and the management of individual technical response teams. The role of the Incident Commander may be filled by a human "player," but is more typically an Artificial Intelligent Non-Player Character. Having the Incident Commander role played by the AI Non-Player Character facilitates greater control of the aspect of incident response being taught in the game play to the "other" human roles being played or a particular single person playing the particular role. The use of the NPC in this manner allows the systems of the present disclosure to tailor the lessons being taught to one or more of the humans in a more structured and targeted manner. For example, the AI can have a programmatic response for every decision for each Actor's actions. In addition, the pattern of good or poor choices can be easily programmed to give feedback to the Actor. By doing so learning and education can be integrated repeatedly and cohesively without a dependence on a human watching for actions that may take place simultaneously. the AI can have a programmatic response for every decision for each Actor's actions. In addition, the pattern of good or poor choices can be easily programmed to give feedback to the Actor. By doing so learning and education can be integrated repeatedly and cohesively without a dependence on a human watching for actions that may take place simultaneously.

Incident Communicator; The incident communicator is responsible for inter-team communication during incident response. The communicator role is typically taken on by someone familiar with the incident response structure, and who has good communications experience. The priority of the incident communicator is to ensure fast, structured communication between management and response teams, ensuring as little communicative friction as possible.

Chief Executive Officer; The CEO manages the overall fiduciary responsibility to employees, customers and shareholders. The CEO is responsible for decision making for funding, resources, and important PR (public relations) and management decisions during several points of an incident. An example of the CEO's special ability is to temporarily stop time for all Actors.

Chief Information Officer (CIO); The CIO manages the technology and technology organization. They are able to quantify the threat and have a unique view into the IT organization. They provide key information to the rest of the team. An example of the CIO's special ability is to lower the threat or intensity as it applies to the current scenario.

Human Relations (HR); HR is responsible for the people, processes, and systems necessary to manage the human capital within the organization. Onboarding, offboarding, information on employees, are within this area of responsibility. An example of the HR special ability is to execute a unicorn hire which will solve a particular issue in a given scenario.

Legal; This role is responsible for all aspects of legal response, including but not limited to disclosure, coordination with law enforcement, and third-party legal counsel. An example of the legal team's special ability is to win a lawsuit which reduces the damage caused by the particular scenario.

Other major roles may be added into the game. Some extra roles may include:

Helpdesk/Tech Support/IT Lead; The tech lead is typically a senior technical responder. They are responsible for developing theories about what's broken and why, deciding on changes, and running the technical team during the incident. This role works closely with the incident manager. This role may also be required to communicate updates to incident manager and other team members, document key theories and actions taken during the incident for later analysis, participate in incident postmortem (what went right/what went wrong or WWR/WWW reports), and page additional responders and subject matter experts.

Public Relations (PR); PR is the person or group familiar with public communications, possibly from the customer support or public relations teams. This role is responsible for writing and sending internal and external communications about the incident. This role is usually the person who updates the status page. This role is also responsible for collecting customer responses, and interfacing with executives and other high-level stakeholders.

Operations; This role is responsible for continuing operation of the firm, and any short term or long-term fixes necessary during an incident.

Events

The event system is the backbone of the randomized scenario interaction system. Events are dispatched from the incident commander. All Actors are responsible for responding to events within a predetermined time window. Events generally have a tradeoff that may be positive, negative, or more nuanced. Events may have the following major properties:

Title: the title displayed for the event popup.

Flavor Text: the flavor text explaining the event and immersing the player in the presented situation.

Triggers: the conditions that must be met in order to let the event be launched.

Percent Chance: the chance that the event should fire once its triggers are met.

Severity: the severity level (also called threat level) associated with the event. A high value corresponds to a highly impactful event (negatively) and a low value corresponds to a helpful/unimpactful event.

Choices: the choices available for the players to take to respond to the event. Each choice has flavor text (the text explaining the choice to the player) and effects (the effects from taking the supplied decision).

Event Definitions

Events are partially defined by the scenario maker and partially default. A set of events is provided in the game by default to add more content, however the person defining the scenario may define custom events in the scenario editor.

Severity and Event Firing

Events are not simply fired/launched when their triggers are met, the severity of events is procedurally generated through an algorithm. The event management system has an aggregate severity score for the events being fired (simply add the severity of the event into the total). When this total is below the target severity, the system is more likely to fire a high severity event. When the total is above the target severity, the event system will hibernate or attempt to fire a low-severity event. This severity total is reduced over time, ensuring that events are not too oppressive or too sparse.

Curveball Principle

The most obvious application of the event system is a curveball, or a negative event that is launched to curb the performance of an incident response team who is having too easy of a time. Curveballs are triggered to increase the challenge of a scenario, add in a bit of excitement, or to simply help people train for the "unexpected". The curveball may be previously programmed or fired or launched by an administrator of the systems of the present disclosure. Some examples of curveball events are:

Employee/Employee's wife goes into labor, removing them from the game for an in-game day.

An external penetration test sets off an alert system, causing a false positive.

Microsoft releases a new update which takes down a vital server.

Phone systems go out (due to a massive, statewide storm)

Game Phases

Figure 4:
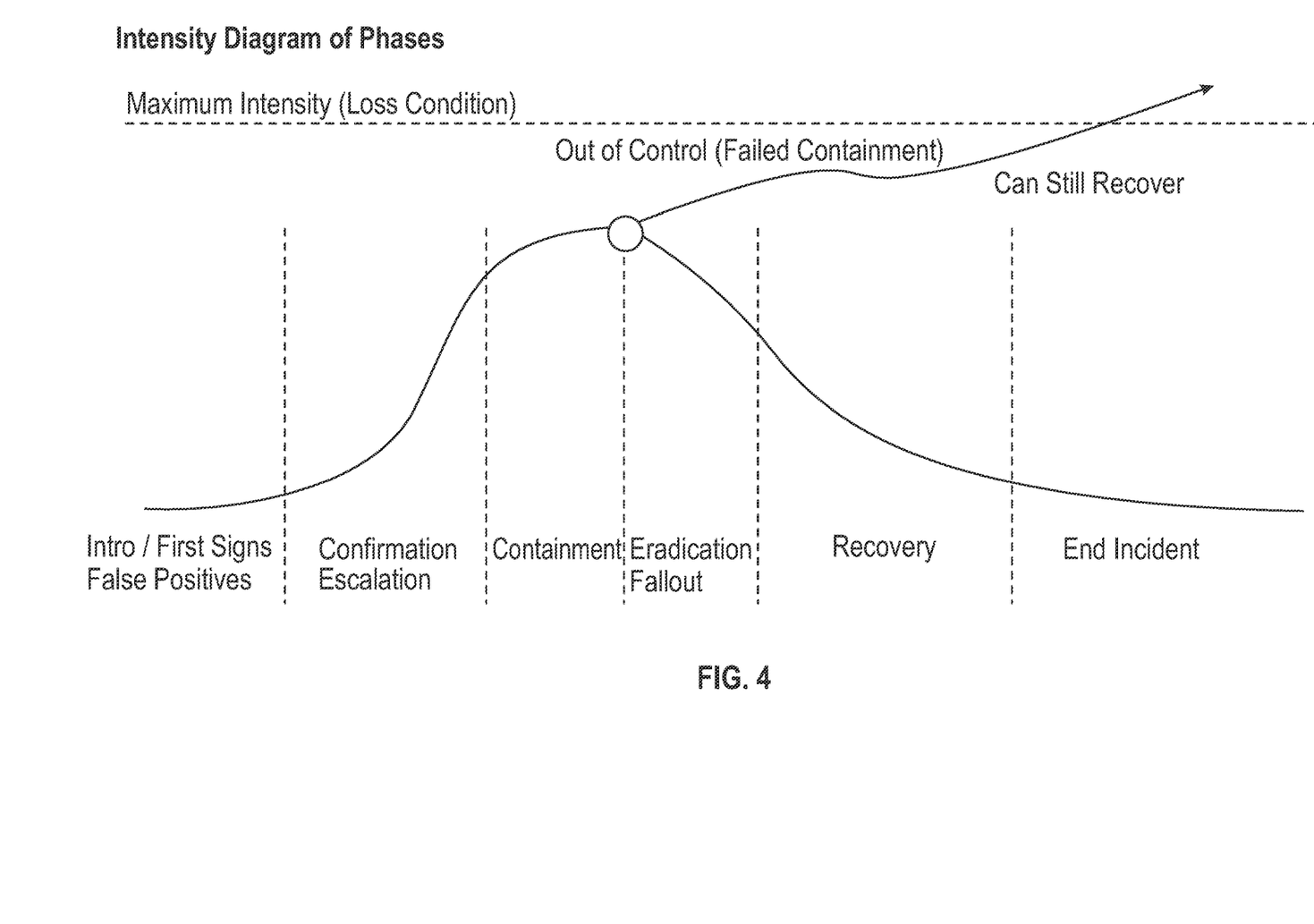
FIG. 4 is an intensity diagram for the wargame from a user's perspective.
Figure 5:
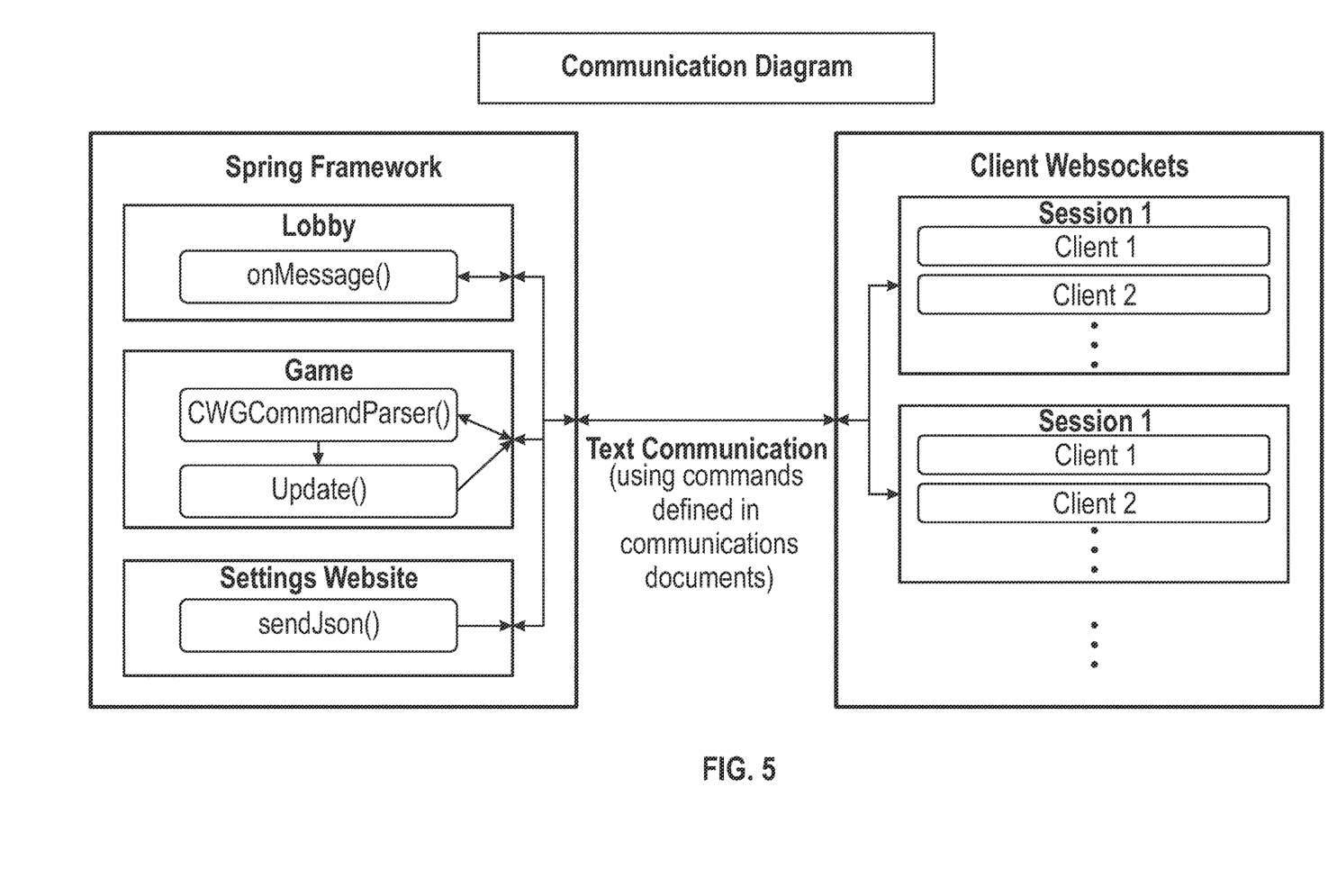
FIG. 5 is a communication diagram between the client devices and the game framework.

While each turn is done the same every time, turns are not the only representation of time within the game. Events or actions taken by the participants change the game's general state which corresponds to the SANS IR Steps. As with a literary plot diagram, intensity rises through the game, and falls back down as the incident is contained (see FIG. 4). The "higher" the value on the diagram, the more intense or chaotic the game will feel. The diagram is also divided into phases and follows the idea of a literary plot diagram. In addition, there is an inflection point at the peak of the diagram, where the incident either falls under control (and intensity decreases) or the incident becomes uncontrollable (spikes higher and ends the game).

All Actors can give time to other actors and can spend their time to receive a hint such as a 50/50 reduction in choices for a given next step. Time will move differently depending on button presses (from slowest to fastest)- reading threat intel (near stopped), no buttons pressed, single call, multi user call, super power. A good decision may slow time or add time, a bad decision may speed time or lose time. This time mechanic is a unique aspect to the simulation.

The primary event phases are found below.

Intro/Signs of Incident/False Positives

After the game has been set up and roles defined, the beginning phase of the scenario is the introduction and beginning of the false positives of incidents. This part of the game tests participants' abilities to identify when an incident is going to happen, determine between false positives and actual negative events, and when to escalate the incident into a severe incident.

Confirmation and Escalation

This phase begins when an event causes the incident response team to assemble and confirm that an incident has occurred. This phase is essential for 'setting the tone' of the initial incident response technique. During this phase events will continue to force escalation upon the scenario until the incident has been contained.

Containment

The containment phase begins when the incident response team identifies the incident correctly and begins acting to contain its effects. If everything goes properly, containment should mark the apex of intensity within the scenario, as shown by the circle in the intensity line of FIG. 4. If the incident is not contained properly in a timely manner, the incident will continue to grow out of control, eventually leading to chaos and a loss event.

Eradication

The eradication phase of events is part of the decline in scenario intensity. It begins when the incident has been completely contained and players are beginning to reduce its effects.

Fallout

The fallout phase marks the final 'collateral damage' caused by the incident and sets up the recovery phase. Fallout can range from a wide-scale data breach to something as small as a single computer requiring a full re-image.

Recovery

The recovery phase is used to clean up the damage caused while eradicating and containing the incident. During this phase, appropriate agencies, individuals, and/or clients must be identified of the incident, what was critically damaged or compromised during the incident.

Incident Cleared

Once the incident is believed to be over, the incident response commander can 'make the call' to confirm the incident has been eradicated. Even if wrong, this marks the end of the game. If the incident response commander made the wrong call to end this game, this will result in a large penalty to the overall score.

Assets

Assets are the abstraction representing company resources. Assets come in different 'flavors' and can each be impacted differently. Assets all have a reliability score and a health score representing their status. Assets may be modeled very close to substantially exactly matching the asset allocation of the organization that is going through the game. The antagonist in a scenario is attempting to somehow negatively affect assets.

Types of Assets

Assets come in several different types.

Data

Data is an abstraction representing a data store, such as a database, file cabinet, hard disk, memos, or any other hard or soft data storage. Data can be infiltrated (reading) or exfiltrated (copying). Data should be limited to access by only certain users Applications Applications represent some form of 'process handling' (rename) in an organization. This is more easily used in a cyber setting. An application may be a webpage, active directory manager, assembly line controller, etc. Applications can be infiltrated and damaged by the antagonist. Health in this context is analogous to application functionality.

Devices

Devices are abstractions representing any sort of useful device in the organization, such as workstations, desk phones and cell phones, servers, robotic assemblers, and other devices utilized by the specific organization. Device health in this context is once again tied to functionality. Devices can be used by certain users. Poor device health leads to poor application and data health.

Users

Users are abstractions representing an employee or a client or a system user. A user is effectively just a name and access level. User health may be binary, i.e. the user may be compromised or not compromised.

Facilities

Facilities is the abstraction of the building(s) the organization resides in. Parameters of the facilities include power status, working doors, weather, heat, etc. Facility health has an impact on productivity and device health. Health in this context is how functional the facilities currently are.

Organization Details and Effects

An organization is the primary container for all of a simulation's assets. Organizations are abstractions of a real-life business and have several properties which impact gameplay. Organizations may be entire entities like companies or may be individual units within a larger entity like individual departments within a company, or possibly a subsidiary of a larger organization.

Scenario Scoring

Cyber Security Framework (CSF) Scores and Game Setup

The CSF scores may be vital to setting up an accurate and representative scenario for any given organization and are the preferred method of scoring. CSF scores are a cybersecurity standard provided by the National Institute of Standards and Technology (NIST) and may be found at https://www.nist.gov/cyberframework. Although CSF is preferred, CIS-20 scoring is another scoring method and is detailed below.

Identify

The Identify score is used within the game as an initial knowledge value for the company's range of machines. A higher Identify score means the company better understands strengths and weaknesses in their systems, so this knowledge is used to allocate protection to the machines that most need it. A lower Identify score means little is known about their systems, and as such will more evenly spread protection amongst machines. Identify also governs the familiarity with assets, which can help with detecting intrusions.

Protect

The Protection score is used to represent the total time and effort used to protect a company's machines. Total protection amount is determined by the provided CSF score, and spread among machines according to the companies Identify score.

Detect

The Detect score represents the ability of incident response members to detect a threat. Combined with Identify (to a lesser extent), Detect is primarily used when scanning systems for indications of an infiltration. This score is especially useful in the identification phase, though remains useful throughout the game in finding the threat to be contained.

Respond

The Respond score represents the ability of the incident response team and executives alike to isolate the incident. This score is generally used in the containment phase and is used to determine the effectiveness of many of the actions to be taken in preventing the spread.

Recover

The Recover score represents the ability to restore the functionality of systems and relationships with clients. This score is used in the final phase and determines the effectiveness of events which attempt to restore the systems or public opinion. As with the Respond score, it is highly specialized for the final recovery phase.

CIS-20 Scoring

CIS-20 scores will be used to impact the scenario in ways which attempt to simulate the organization's real environment, strengths, and weaknesses. For an example list of that which is included, see https://www.cisecurity.org/controls/cis-controls-list/ for the full list of controls. The controls used for the simulation may include the following:
1. Inventory and Control of Hardware Assets
   2. Inventory and Control of Software Assets
   3. Continuous Vulnerability Management
   4. Controlled Use of Administrative Privileges
5. Secure Configuration
   6. Maintenance, Monitoring, and Analysis of Audit Logs
   7. Email and Web protections
8. Malware Defenses
   9. Control of Network Ports, Protocols, and Services
10. Data Recovery Capability
   11. Firewall, Router, and Switch Configuration
12. Boundary Defense
   13. Data Protection
14. Controlled Access
   15. Wireless Access
16. Account Monitoring and Control
   17. Security Awareness and Training
18. Application Software Security
   19. IR Response and Management
20. Penetration Testing and Red Team Exercises These factors, or fewer or more, may play into the severity, traversal, and containment of an incident during the simulation. For example, organizations with high data recovery capabilities have the option to simply recover lost machines, rather than completely fix them. Alternatively, organizations with high amounts of incident response readiness are given more time to carry out their actions.

Organizational Parameters

The CIS-20 factors are important for determining threat characteristics, but other information is needed to have an accurate simulation. Below are some additional parameters:
   1. Organization Size (1-small up to 5-large).
   2. Number of employees on the technical team (Determines the number of technical response manpower for the incident coordinator).
   3. Number of employees on the business team (Determines the resources available to the executive team during their actions).
   4. Number of Clients (affected by the size of the organization and impacts the severity of incident as well as responsibilities of PR).
   5. Technical Resources (determines the ease with which the technical coordinator can carry out tasks).

Each of these organizational parameters may be set in advance of the users participating in the simulation and, like the roles of the users, can be set to mimic the characteristics of the organization the users are part of. This provides a more tailored and uniquely specific learning experience for each of the users as it more accurately reflects the "real-world" environment they are participating in should an actual cybersecurity event occur in their organization.

Factors of Success & Scoring

Time remaining to the Actors at the end of the scenario combined with factors of success are the typical ways the systems of the present disclosure measure the success of a team completing an incident response scenario. Factors of success can be measured through several categories:

From the standpoint of the CEO role, company reputation is the level of success the company has in the eyes of the public. This factor is impacted by the following:
   Media Coverage—the amount of interest the media currently has in the incident being responded to.
   Media Negativity—the ratio of negative to positive news coverage for the current incident being responded to.
   Investor Happiness—the level of confidence and happiness investors and board members have regarding the response.
   Client Happiness—the level of confidence and happiness currently affected clients (affected and not affected) have regarding the response.
   Stock Price—the current stock price in your company. Stock price also includes how much has it changed since the beginning of the incident.
   Compliance Status (NIST, ISO, PCI, HIPAA, etc.)—the current legal standing of your business regarding any number of regulatory bodies.

From the standpoint of the CIO role, asset uptime and performance (Asset Health) throughout the scenario and technological debt incurred are the factors of success. Asset Health corresponds to damage done to company property. This factor is impacted by the following:
   Average reliability of all combined assets
   Employee Stress Level
   Amount of data exfiltration
   Amount of downtime
   Company income impact from incident From the standpoint of the HR role, good hires, good employee retention, and company culture are the factors of success. Company Culture is the level of success a company has at creating a happy and productive work environment. This factor is impacted by the following:
   Employee Happiness
   Upper-Management Happiness
   Employee Stress Level
   Productivity (productivity in this respect may mean how many actions were taken throughout the course of the incident and how that compares to the average)

From the standpoint of the Legal role, any contract negotiations and execution of the contracts are the factors of success.

The time remaining will be clearly communicated on screen and a dashboard of a person's responsibilities will be available once a week in a post week report. Available rewards will be easily communicated upfront so the player knows how exactly they can win and win big. Each user will have security scores as an output of each game that feeds into the scoring system. The game end phase may include badging that functions in conjunction with a user profile that feeds into the scoring system and builds profiles of such on each player. Each game may include a measurement achievement (likely meta games) such as a star rating on how well each user and the team as a whole completed the scenario.

Scenario Design

Scenarios are the storyline behind any given playthrough of the game. They consist of many different parts which affect gameplay style, intensity, and objectives.

Company Profile
        Company Size
        Technologies Available
        Personnel Available
    Network Setup
        Companies Machine Assets
            Number, Users
        Network Layout
    Security Profile
        Import CIS Controls list
        Determines initial scale of incident
        Determines location of incident
        Determines ability to contain/eradicate incident
    Objectives/Loss Conditions
        List of win/loss conditions for the scenario
        Conditions are optional
            Built in Loss: Failure of Containment/Eradication
            Built in End: Incident Commander or other role predefined to have the ability to declare the incident removed does so.
    Scenario Type Scenario Examples Malware Infection A malware infection is based around the filesystem of the device. A file on the machine represents a malicious file and can spread between systems if applicable. The file can also evolve with the scenario, turning into ransomware, a worm, or other types.

Phishing/Social Engineering

An event causes a user or a set of users to become compromised, along with all the machines/data they have access to.

Machine Configuration Errors

An event identifies one machine's firewall to not be configured correctly. Upon examining the logs, the team finds that private user data stored on the machine was consistently being accessed from a machine in an unapproved location.

Data Recovery (how does this Correspond to an "Incident")

Backup copies of servers are stored at a time interval specified by the size of the company. In the event of an emergency, machine states can be reset to their backup condition.

Boundary Defense

Firewalls should be configured correctly on every machine.

Data Protection/Permissions Errors/Need to Know Errors

Data should be correctly protected on the devices it resides on.

In addition to the differences cited in the above detailed description of the game, the automated version of the game provides numerous benefits that are simply not possible if the concepts of the present disclosure were attempted in a physical in-person version of the game were used. One of these is especially relevant in a time of pandemic, when many people are being forced or choosing to work remotely. In-person tabletop games are simply not an option with remote employees. In the automated version of the game, a player may join from their computer or laptop, or even using an app on their mobile device, and need not be present in the room with a host or a game facilitator.

Money may also be included in the automated version that can be difficult if not impossible to implement in the board game. Certain actions within the game may cost money against a player's given "budget". As with other parameters, the "budget" in the simulation for each role may approximate or exactly correspond to the budget a particular role has in the actual organization. In this manner, the systems of the present disclosure may provide executives and other decision makers within an organization with at least an approximation of the real-world impacts their budgetary decisions have on their organization/team's ability to deal with a cybersecurity event. After this, the organization may also change the budgetary amount of funds available to each role in its organization in response to a cybersecurity threat and/or provide for my technical and physical resources and personnel to respond more quickly and/or differently to an event. In the case of a user in the simulation not having a sufficient budget to take a certain action, that player must make a request to increase their budget to the Incident Commander, who may or may not have the budget to supply to the player or there may be a decision (possibly outcome determinative) to be made when the Incident Commander has multiple requests for money from many different players and must plan to whom and where their remaining budget goes. All users then see the effect of the decision as in other decisions in the simulations of the present systems.

Another benefit of the automated version that is not available with the board version is the ability to track and record actions taken by the players and their immediate consequences in real-time, and generate a log of the actions, consequences, and events for later debriefing. In this way, the response team can review their actions and see what the responses and events were triggered based on that immediately following the game, or perhaps even during the game for instantaneous feedback.

Further, the organization's own asset structure can be modeled exactly how it resides within the organization at any given time. For instance, an incident may be set up to trigger at a random time based on any number of criteria, such that the players have no idea when the scenario will drop and the game will start. One criterion may be a user clicking on a fake malware link sent as a test run phishing email from the IT department. In this way, no matter when or where the response team may be, the game begins. In this way, real-time scenario stresses may be introduced because the team has not set aside a few hours, or a day, or longer to work on this specifically, but rather the game will be played in real-time while the players each have their other day-to-day tasks that they are still responsible for, creating as close to a real-life, real-time incident response as possible.

Once a game is complete, or a series of games is complete, a customized "lessons learned", WWR-WWW (what went right, what went wrong) report, and other conclusions that resulted from each of the system user's actions or lack thereof may be produced and disseminated immediately following the game. These results may be fed back into the system of the present disclosure for another future scenario which places more emphasis on areas that the response team may have struggled with during the simulation, for example.

The output of each decision and action an Actor takes may be recorded in a database and have a security score or a game score applied to it. The game score may be an overall game score or may apply directly to a specific success factor which then is fed into an overall game score. Further, the game scores may be aggregated by user or by team, such that positives and negatives at both the team and user level may be analyzed. These scores will then flow into a Learning Management System for follow up and additional education, as needed. The Learning Management System may be integrated in the system of the present disclosure or integrated into the user's organization's already existing Learning Management System for future use by that system to provide user specific training on parts of the simulation where performance could be improved. The recording and their respective scores may be played back to the users by a facilitator at a later time to incorporate greater learnings into the scenarios.

The area of incident response is a constantly evolving and changing area. As responses and their attendant reactions evolve, a single server or computer connected to the Internet can be updated with updated severities and appropriate responses to any given events. Because the team is using electronic, automated versions of the game on their client device such as a desktop computer, laptop computer, cell phone, and/or tablet, they too may be updated immediately in real time. Using the board game, new rules must be implemented, new sheets must be printed, game facilitators must be re-trained, etc. With a single point of update with the automated version, none of that is necessary, and the game can be updated real-time.

Further, the computer systems of the disclosure may be used to create an automated version of the simulation that applies to more than simply a cyber-attack on an organization. The assets of the automated version of the simulation may be renamed and repurposed to any number of emergency responses.

For instance, in an embodiment, a response to a wildfire out of control may be modeled. Instead of money requests, those particular assets may be repurposed to water sources, firefighting aircraft, or any other limited asset that an Incident Commander (or similarly defined and named role for the scenario) must decide where to apply. The workers in this embodiment may be on-the-ground firefighters, and the PR aspect may instead be modeled as a local panic level.

In other embodiments, the assets may be renamed and repurposed to a pandemic response, hurricane damage, large-scale power outage, military scenarios, or any other scenario where training and quick responses are necessary and required. The scoring criteria in the cyber event (reputation, culture, and health) may be renamed and repurposed for any of these other scenarios, including property damage, user productivity lost, local health of the population, military strength, or any other quantitative or qualitative score that the organization would like to track. The assets of the program are functional and abstract enough that nearly any emergency response can be modeled, trained, debriefed, and retrained to the point where any organization can be confident in their response.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A method of simulating an emergency response training scenario to and facilitating communication between users in different locations, the method comprising the steps of:
   customizing a scenario and initiating a game state on a host electronic device, the game state comprising a threat level and a time remaining;
   assigning a role to each of a plurality of users, wherein each of the plurality of users each has access to at least one client device connected to the host device;
   assigning digital assets within the scenario to each of the plurality of users based on the role assigned to each of the plurality of users;
   displaying an introduction sequence to the plurality of users on the at least one client device;
   initiating an incident on the host device, the incident comprising an issue and a plurality of possible responses;
   simultaneously notifying a first group of at least two of the plurality of users of the incident;
   logging and scoring a chosen response to the incident from at least one of the plurality users from the plurality of possible responses as compared to a predetermined scoring system;
   updating the game state based on the incident and chosen response from the at least one of the plurality of users whereby the threat level is raised or lowered and the time remaining is increased or decreased;
   triggering an event that is simultaneously communicated to a second group of at least two of the plurality of users, wherein the event comprises a severity level;
   wherein the severity level of the event being triggered is based on the threat level for the scenario at the time the event is triggered;
   wherein the threat level of the scenario is increased and the time remaining is decreased by events and incorrect responses from the plurality of users, and the threat level of the scenario is decreased and the time remaining is increased by correct responses from the plurality of users;
   communicating a score calculated in the logging and scoring step to at least one user on one of the at least one client device; and
   automatically creating a log of scenario results containing at least one of scenario chosen, scenario start time, event trigger times, user communication times, user response times, user responses, user communications, events triggered by specific user responses, event trigger criteria, event trigger chances, event trigger random numbers, scenario severity levels, and total time to recover.

2. The method of claim 1, wherein at least two of the plurality of users are not co-located and the host electronic device is a cloud-based computer server system;
   wherein the at least two of the plurality of users that are not co-located do not have access to the same screen;
   wherein the updating the game state step includes the step of updating digital asset availability to each of the plurality of users, wherein available digital assets are increased based on correct responses and decreased based on incorrect responses; and
   wherein the first group and the second group of at least two of the plurality of users are the same.

3. The method of claim 1, wherein the triggering an event step occurs randomly throughout the scenario.

4. The method of claim 1, wherein the step of triggering an event occurs based on a predetermined criteria set, wherein the criteria set is based on a combination of events and logged responses.

5. The method of claim 1, wherein an availability of digital assets affects a rate at which the severity of the scenario is decreased.

6. The method of claim 5, wherein a scenario score is immediately generated based on the log of scenario results.

7. The method of claim 6, wherein the scenario score is generated automatically following a scenario and the scenario score is transmitted to a learning management system of the user's organization and later used to further educate the user with targeted educational programming related to the scenarios score and user's performance.

8. The method of claim 6, wherein the scenario score comprises factors of success, wherein the factors of success are chosen from the group comprising company reputation, company culture, and asset health.

9. The method of claim 8, wherein a score is generated based on the responses from the plurality of users based on a Cyber Security Framework (CSF) scoring standard, wherein a score is generated based on the responses from the plurality of users based on the CIS-20 scoring standard.

10. The method of claim 9, wherein a second scenario is generated based on the scenario score with respect to the factors of success.

11. The method of claim 1, wherein a customized lessons learned report is immediately and automatically generated at completion of the scenario; and wherein at least one of scenarios, events, responses, assets, triggers, and scoring criteria are updated on a computer connected to the Internet.

12. The method of claim 11, wherein the at least one of the scenarios, events, responses, assets, triggers, and scoring criteria are simultaneously and in real-time updated on a client device that is connected to the Internet.

13. The method of claim 1, wherein the client devices are connected to the host device electronically either directly or by communication through the Internet via a wired or wireless signal.

14. The method of claim 1, wherein digital assets available in the scenario are based on actual assets available to an organization.

15. The method of claim 14, wherein the plurality of users are from the organization and roles assigned to each of the plurality of users are based on a role each of the plurality of users has within the organization, wherein the customizing a scenario step is performed automatically, wherein the customizing a scenario step is performed randomly.

16. A method of simulating a realistic emergency incident for the purposes of training a plurality of users how to respond to the emergency incident, the method comprising the steps of:
preparing an emergency scenario having a game state, a time remaining, and a plurality of specific issues and a plurality of prepared responses to the plurality of specific issues;
wherein the plurality of prepared responses comprise reading threat intel, a decision button actuation, a single call, a multi-user call, and a super power use;
displaying an introduction sequence to the plurality of users on a client device of each of the plurality of users, wherein the plurality of users are not co-located;
defining a plurality of roles for the emergency scenario and assigning one of the plurality roles to each of the plurality of users;
wherein a subset of the plurality of specific issues and a subset of the plurality of prepared responses are specific to each of the plurality of roles;
assigning a subset of a plurality of assets to each of the plurality of users based on the assigned roles of each of the plurality of users;
initiating an event of the emergency scenario, the event comprising at least one of the plurality of specific issues and at least one of the plurality of prepared responses;
simultaneously notifying a first group of at least two of the plurality of users of the event;
logging a response to the event from at least one of the plurality users of the first group;
updating the game state by comparing the response to the event from at least one of the plurality of users to at least one of the plurality of prepared responses, updating a threat level upwardly or downwardly, and adding or removing an amount of time to the time remaining;
communicating the time remaining to each of the plurality of users;
initiating a second event of the emergency scenario, the second event comprising at least one of the plurality of specific issues and at least one of the plurality of prepared responses;
simultaneously notifying a second group of at least two of the plurality of users of the event;
logging a response to the second event from at least one of the plurality users in the second group;
updating the game state by comparing the response to the second event from at least one of the plurality of users to at least one of the plurality of prepared responses, updating the threat level upwardly or downwardly, and adding or removing an amount of time to the time remaining;
removing at least one of the subset of the plurality of prepared responses when the threat level is updated above a predetermined threshold;
calculating a game score for each of the plurality of users by comparing the responses from each of the plurality of users to a predetermined table of possible responses to each event of the emergency scenario, and communicating the game score of each of the plurality of users to the respective one of each of the plurality of users; and
automatically creating a log of scenario results.

17. The method of claim 16, wherein the game score of each of the plurality of users is communicated to a facilitator, a learning management system, or both the facilitator and a learning management system;
wherein the automatically created a log of scenario results is automatically created throughout the scenario containing at least one of scenario chosen, scenario start time, event trigger times, user communication times, user response times, user responses, user communications, events triggered by specific user responses, event trigger criteria, event trigger chances, event trigger random numbers, scenario severity levels, and total time to recover;
wherein the game score is immediately generated based on the log of scenario results;
wherein the game score is generated automatically following a scenario;

wherein the game score comprises a plurality of success factors, wherein the success factors are chosen from the group comprising company reputation, asset health, company culture, and contract execution;

wherein a second scenario is generated based on the game score, and wherein the second scenario is configured to train the success factors that scored lowest;

wherein a customized lessons learned report is immediately and automatically generated at completion of the emergency scenario; and wherein the plurality of roles comprises Chief Executive Officer (CEO), Chief Information Officer (CIO), Human Resources (HR), and Legal.

18. A method of training a plurality of users for a response to an emergency incident such as a data breach within a company, the method comprising the steps of:

preparing an emergency scenario having a game state, a time remaining, and a plurality of specific issues and a plurality of prepared responses to the plurality of specific issues;

displaying an introduction sequence to the plurality of users on a client device of each of the plurality of users, wherein the plurality of users are not co-located;

assigning one of a plurality roles to each of the plurality of users, the plurality of roles comprising Chief Executive Officer (CEO), Chief Information Officer (CIO), Human Resources (HR), and Legal;

wherein a subset of the plurality of specific issues and a subset of the plurality of prepared responses are specific to each of the plurality of roles;

initiating an event of the emergency scenario, the event comprising at least one of the plurality of specific issues and at least one of the plurality of prepared responses;

notifying a first group of at least two of the plurality of users of the event simultaneously;

recording a response to the event from at least one of the plurality users of the first group in a database;

updating the game state by comparing the response to the event from at least one of the plurality of users to at least one of the plurality of prepared responses, updating a threat level upwardly or downwardly, and adding or removing an amount of time to the time remaining;

communicating the time remaining to the plurality of users;

repeating the initiating an event, notifying a first group, recording a response, updating the game state, and the communicating the time remaining steps until the time remaining reaches zero;

calculating a game score for each of the plurality of users by comparing responses from each of the plurality of users to a table of possible responses to each event of the emergency scenario and a corresponding score in each of a plurality of success factors;

communicating the game score of each of the plurality of users to the respective one of each of the plurality of users;

creating a profile for each of the plurality of users wherein the game score is stored and compared to subsequent game scores for each of the plurality of users; and automatically creating a log of scenario results.

19. The method of claim 18, wherein the plurality of prepared responses comprise reading threat intel, a decision button actuation, a single call, a multi-user call, and a super power use;

wherein the method further comprises the step of removing at least one prepared response of the subset of the plurality of prepared responses when the threat level is updated above a predetermined threshold;

wherein the game score of each of the plurality of users is communicated to a facilitator; and wherein the plurality of roles are assigned to the plurality of users that correspond to titles assigned to the user within the user's organization.

20. The method of claim 19, wherein athe automatically created log of scenario results is automatically created throughout the scenario containing at least one of scenario chosen, scenario start time, event trigger times, user communication times, user response times, user responses, user communications, events triggered by specific user responses, event trigger criteria, event trigger chances, event trigger random numbers, scenario severity levels, real time to complete the scenario and game time to complete the scenario;

wherein the game score is immediately generated based on the log of scenario results;

wherein the game score is generated automatically immediately following a scenario;

wherein the game score comprises a plurality of success factor scores corresponding to the user's game score with respect to each success factor;

wherein the game score is fed into a third-party Learning Management System which generates user-specific training on parts of the emergency scenario where the game score is below a predetermined threshold;

wherein a second scenario is generated based on the game score, and wherein the second scenario is configured to train the success factors that scored lowest;

wherein a customized lessons learned report is immediately and automatically generated at completion of the emergency scenario;

wherein the method further comprises the step of replaying the recordings stored on the database with the scores to the plurality of users such that each of the plurality of users understands effects of each of the recorded responses;

wherein the success factors are chosen from the group comprising company reputation, asset health, company culture, and contract negotiation and execution; and wherein the profile for each user comprises success factors.

* * * * *